United States Patent [19]

Imakoshi et al.

[11] Patent Number: 4,679,107
[45] Date of Patent: Jul. 7, 1987

[54] MAGNETIC TRANSDUCER HEAD UTILIZING MAGNETORESISTANCE EFFECT

[75] Inventors: Shigeyoshi Imakoshi; Yutaka Soda; Hideo Suyama; Yasuhiro Iida, all of Kanagawa, Japan

[73] Assignee: Sony Corporation, Tokyo, Japan

[21] Appl. No.: 643,398

[22] Filed: Aug. 23, 1984

[30] Foreign Application Priority Data

Aug. 25, 1983 [JP] Japan ................. 58-155484

[51] Int. Cl.$^4$ ......................... G11B 5/127; G11B 5/33
[52] U.S. Cl. ................. 360/113; 338/32 R; 324/252
[58] Field of Search ............. 360/113; 338/32 R; 324/252

[56] References Cited

U.S. PATENT DOCUMENTS

| 3,864,751 | 2/1975 | Bealieu et al. | 360/113 |
| 3,921,217 | 11/1975 | Thompson | 360/113 |
| 4,141,051 | 2/1979 | Kuijk et al. | 360/113 |
| 4,425,593 | 1/1984 | Postma | 360/113 |

FOREIGN PATENT DOCUMENTS 53-149309  12/1978  Japan ................................. 360/113

OTHER PUBLICATIONS

Feng, "Initializing Single-Domain States in Barberpole Magnetoresistive Sensors", vol. 20, No. 6, Nov. 1977.

Primary Examiner—John H. Wolff
Assistant Examiner—Benjamin E. Urcia
Attorney, Agent, or Firm—Hill, Van Santen, Steadman & Simpson

[57] ABSTRACT

A magnetic head utilizing the magnetoresistance effect comprising a magnetoresistance effect element and a conductor for applying a bias magnetic field to the element by being supplied with a bias current. The conductor is further supplied with a decaying alternating current superimposed on the bias current in advance of the playback operation, so that the hysteresis effect of the magnetic circuit is cancelled and the invariable output characteristics of the magnetic head are obtained.

2 Claims, 6 Drawing Figures

MAGNETIC TRANSDUCER HEAD UTILIZING MAGNETORESISTANCE EFFECT

BACKGROUND OF THE INVENTION

1. Field of the Invention

The present invention relates to a magnetic transducer head utilizing the magnetoresistance effect.

2. Prior Art

FIGS. 1 and 2 are a magnified plan view and magnified cross-sectional view, respectively, showing the principal portion of the magnetic head utilizing the magnetoresistance effect. This magnetic head has a magnetoresistance element located rearwardly offset with respect to the contact plane confronting the magnetic recording medium, and is categorized as a so-called rear-type magnetic head. The structure of the rear-type magnetic head is as follows. On a magnetic substrate 1 made of, for example, Ni-Zn ferrite or Mn-Zn ferrite, there is deposited through an insulating layer 2 of $SiO_2$, $Si_3N_4$, etc., if the substrate 1 is conductive such as the case of Mn-Zn ferrite, a current means 3 in the form of a band of conductive layer for producing a bias magnetic field for a magnetoresistance element, as will be described later, by being supplied by a conditioning currrent supply means B, FIG. 1, a bias current. The current means 3 is overlaid through an insulating layer 4 similar to the layer 2 by a magnetoresistance element 5 made of, for example, Ni-Fe alloy or Ni-Co alloy film measuring, for example, 10 m width and 300–500 A thick. The magnetoresistance element 5 is overlaid by a similar insulating layer 6, on which magnetic layers 7 and 8 made of, for example, Ni-Fe alloy in a thickness of about 7000 A are formed so as to construct a magnetic circuit extending across the magnetoresistance element 5 and current means 3. The front end of the magnetic layer 7 extends over the substrate 1 through a non-magnetic gap spacer 9 in a thickness of, for example, 3000 A, and a magnetic gap g, with its gap length defined by the thickness of the gap spacer 9 between the magnetic layer 7 and substrate 1, is formed in the contact plane 10 confronting the magnetic recording medium. The rear end of the magnetic layer 8 is terminated on the substrate 1, for example, in direct contact with each other, so that both members magnetically couple tightly. The rear end of the magnetic layer 7 and the front end of the magnetic layer 8 confront each other with a spacing W provided therebetween, so that a discontinuous section or discontinuity region 11 of the magnetic circuit is formed, and the magnetic circuit is closed magnetically by placing the magnetoresistance element 5 in the discontinuous section 11. Accordingly, the rear end of the magnetic layer 7 and the front end of the magnetic layer 8 are placed on the magnetoresistance element 5 through the insulating layer 6, and the insulating layer 6 is made thin so that the magnetoresistance element 5 is magnetically coupled with both end sections. Thus, a closed magnetic circuit from the substrate 1 to the magnetic gap g, magnetic layer 7, magnetoresistance element 5, magnetic layer 8, and back to the substrate 1 is formed.

A magnetic head element h provided with the magnetic gap g and magnetoresistance element 5 within the magnetic circuit on the substrate 1 is now completed. For a multi-channel magnetic head, magnetic head elements h each constructed as described above are arrayed in parallel on the common substrate 1.

In practice, the magnetic head element h formed on the substrate 1 is covered by a non-magnetic protection layer 12, which is joined to a protection plate 14 by an adhesive layer 13 to complete a magnetic head.

The magnetic head constructed as described above operates as follows. The magnetic flux carrying a signal produced by the magnetic recording medium confronting the contact plane 10 is conducted through the gap g to the magnetoresistance element 5 within the magnetic circuit so that the signal is detected by sensing the variation of resistance. For this purpose, i.e., in order to produce an output or readout representative of the variation of resistance, a sense current is supplied by a source S to the magnetoresistance element 5. In order for the magnetoresistance element to have high sensitivity and linearity, it is given a certain amount of bias magnetic field by application of a current (will be termed "bias current") to the current means 3.

The current means 3 providing a bias magnetic field for the magnetoresistance element has the output characteristics as shown in FIG. 3, in which in a state of the magnetoresistance element supplied with a certain sense current the output increases linearly as shown by the solid curve a until the input bias current $i_B$ reaches a certain value $i_{Bo}$. Accordingly, the magnetic head of this type is used for reproduction of a record on the magnetic recording medium by application of a bias current $I_B$ around the value $i_{Bo}$ to the current means. In actuality, however, the magnetic circuit including the substrate 1, magnetic layers 7 and 8, and magnetoresistance element 5 has a property of hysteresis, and the output characteristics exhibit the hysteresis as shown by the dashed curve b in FIG. 3. Namely, the previous state of the magnetic head affects the output characteristics of the next playback or readout operation to produce a different output for the same bias current $I_B$, resulting in an unstable output of the magnetic head. This is particularly undesirable for a multi-channel magnetic head having a plurality of magnetic head elements h, in which the hysteresis of each head element causes disparity of outputs among channels. In addition, the application of a bias current $I_B$ around $i_{Bo}$ at the beginning of the playback operation causes the creation of an unstable magnetic domain wall, which possibly causes the generation the Barkhausen noise.

SUMMARY OF THE INVENTION

It is an object of the present invention to provide an improved magnetic transducer head utilizing the magnetoresistance effect.

Another object of this invention is to provide a magnetic transducer head utilizing the magnetoresistance effect capable of preventing the instability caused by the hysteresis of the magnetic circuit.

A further object of this invention is to provide a magnetic transducer head utilizing the magnetoresistance effect capable of preventing effectively the generation of the Barkhausen noise.

Still another object of this invention is to provide a multi-channel magnetic transducer head utilizing the magnetoresistance effect capable of providing the balanced playback output characteristics.

According to one aspect of the present invention, there is provided a magnetic transducer head utilizing the magnetoresistance effect comprising a magnetoresistance effect element for sensing a magnetic field, a current source for supplying an electric sense current to the magnetoresistance effect element to effect each readout operation, a conductor for applying a bias magnetic field to the magnetoresistance effect element by being supplied with a bias current, and an alternating current source for supplying a decaying alternating current superimposed on the bias current to the conductor prior to each readout operation wherein the magnetic field is to be sensed by the magnetoresistance effect element.

According to another aspect of the present invention, there is provided a magnetic transducer head utilizing the magnetoresistance effect comprising a magnetic circuit having an effective magnetic gap section confronting a magnetic recording medium which provides a magnetic field representing a recorded signal, a magnetoresistance effect element disposed adjacent another gap section provided in the magnetic circuit so that the magnetoresistance effect element magnetically Couples to the magnetic circuit for sensing the magnetic field provided by the recording medium, and a conductor for applying a bias magnetic field to the magnetoresistance effect element by being supplied with a bias current, the conductor being further supplied with a decreasing alternating current superimposed on the bias current prior to the application of the magnetic field to be sensed by the magnetoresistance element.

DESCRIPTION OF THE PREFERRED EMBODIMENT

The present invention resides in a magnetic transducer head utilizing the magnetoresistance effect comprising a magnetic circuit having a magnetic gap g in a contact plane 10 confronting the magnetic recording medium, a magnetoresistance element 5 disposed by a discontinuous section 11 provided separately from the magnetic gap g in the magnetic circuit so that it couples magnetically to the magnetic circuit, and a current means 3 for conducting a certain amount of bias current so as to apply a certain bias magnetic field to the magnetoresistance element 5, wherein the magnetoresistance element 5 is supplied with a sense current equal to that to be supplied during the playback operation, immediately preceding the playback operation and, at the same time, the current means 3 is supplied with a decaying alternating current superimposed on the bias current equal to that to be supplied during the playback operation while the magnetic field representing the recorded signal is not applied to the gap g of the magnetic circuit. The decaying alternating current has a peak level to produce a magnetic field enough to nullify the previous magnetical trace of the head and a number of current cycles of at least ten before the current has decayed.

Figure 1:
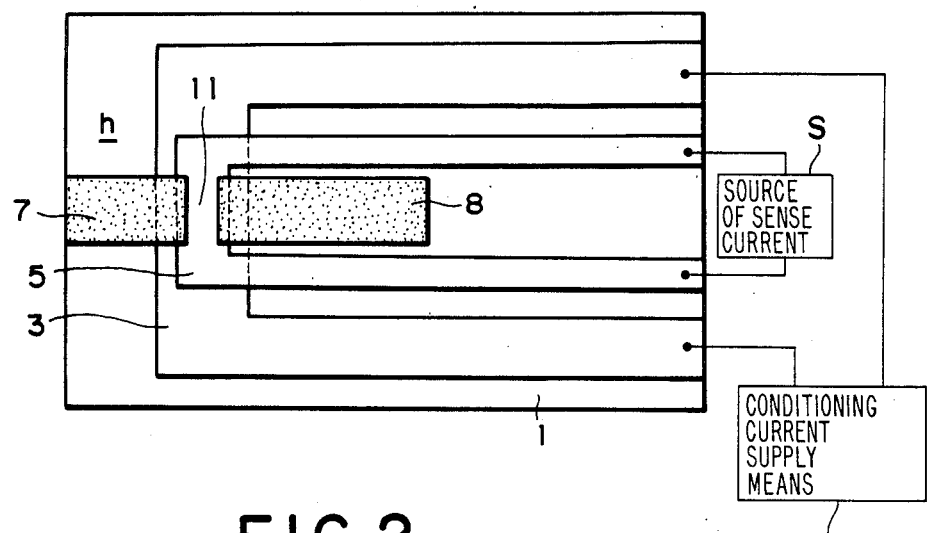
FIG. 1 is a plan view showing the principal portion of the magnetic transducer head utilizing the magnetoresistance effect to which the present invention is applied.
Figure 2:
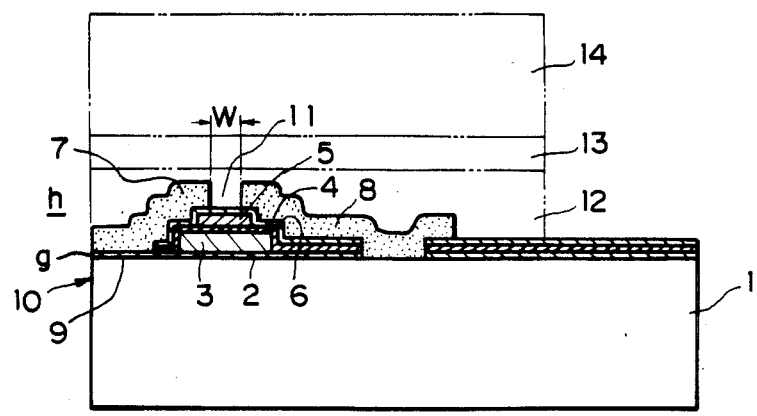
FIG. 2 is a cross-sectional view of the magnetic transducer head shown in FIG. 1.
Figure 3:
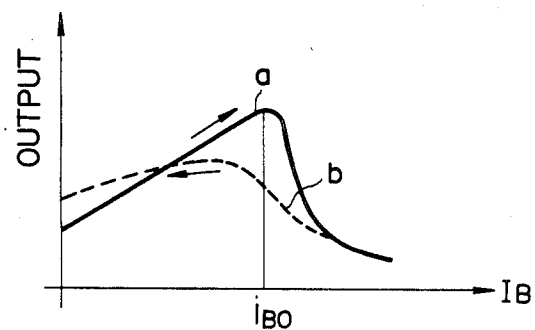
FIG. 3 is a graph showing the output characteristics of the magnetoresistance element plotted against the input bias current.
Figure 4:
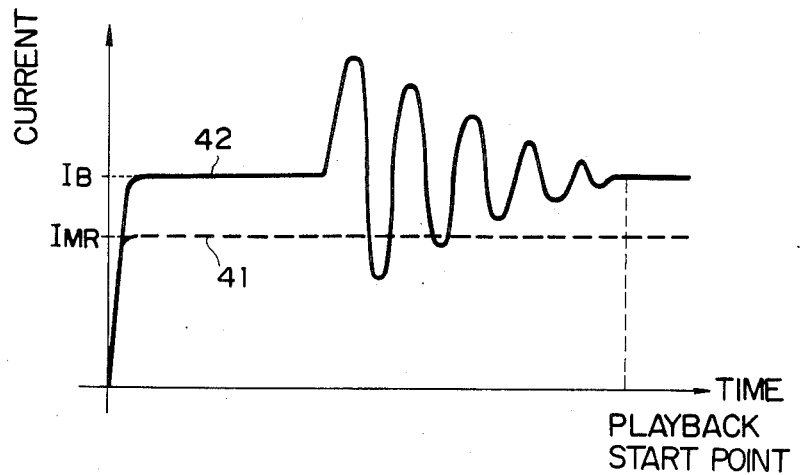
FIG. 4 is a waveform diagram of the current supplied to the magnetoresistance element prior to the playback operation.

According to the inventive rear-type magnetic transducer head utilizing the magnetoresistance effect as described in connection with FIGS. 1 and 2, the magnetoresistance effect element 5 is supplied with the same sense current $I_{MR}$ as that supplied during the playback operation as shown by the curve 41 in FIG. 4 immediately preceding the playback operation, and at the same time, the current means 3 is supplied with a decaying alternating current superimposed on the bias current $I_B$ equal to that supplied during the playback operation as shown by the curve 42 in FIG. 4, so that the magnetic circuit is invariably given a constant magnetization at the beginning of the playback operation.

Figure 5A:
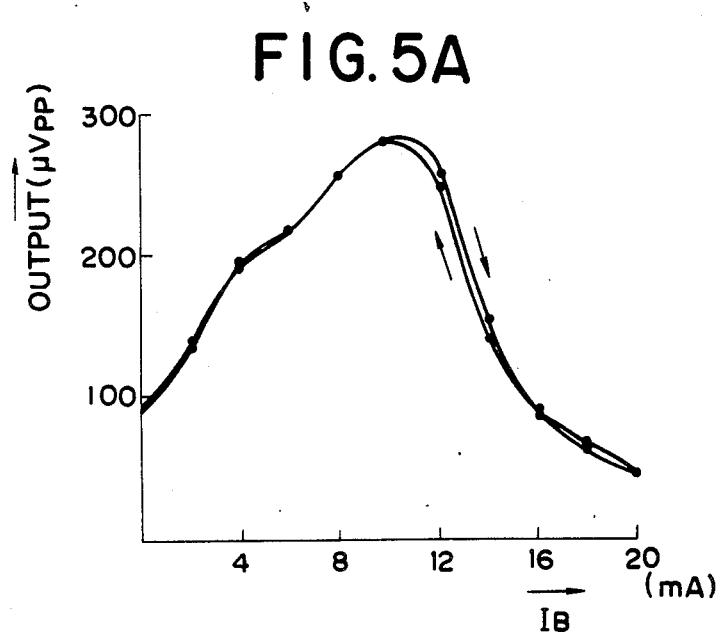
FIGS. 5A and 5B are graphs showing the output vs. bias current characteristics according to the present invention and the conventional magnetic head, respectively.

FIG. 5A is a graph showing the magnetic head output measured following the application of the decaying alternating current superimposed on the bias current $I_B$. Each plot of FIG. 5A is measured by application of an alternating current in a magnitude of 40 mA P—P and a frequency of 5 kHz for a duration of 100 ms followed by a decay of 50% per 10 ms, superimposed on the bias current $I_B$ at that point. During the application of the alternating current, a sense current of 5 mA is supplied to the magnetoresistance element. In the figure, the arrows show that the measurement took place by increasing the bias current and then decreasing the bias current.

It can be seen from this output characteristics that by the application of the decaying alternating current to the bias current means 3 in advance of the playback operation, a stable playback output is obtained independently of the previous bias condition of the magnetic head.

Figure 5B:
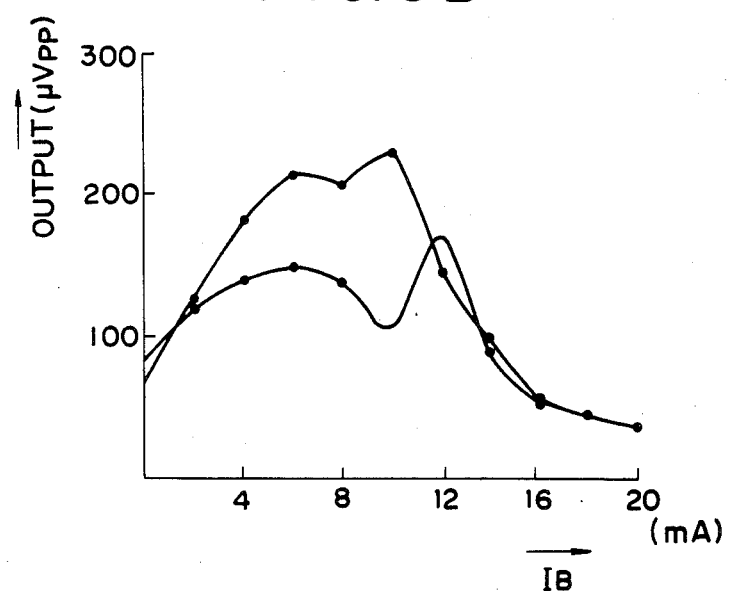

FIG. 5B show, as a comparison with FIG. 5A, the magnetic head output plotted against the bias current without application of the decaying alternating current before the playback operation. As in the case of FIG. 5A, the bias current is increased up to 20 mA and then decreased to 0 mA as shown by the arrows. The figure shows that the absence of the decaying alternating current results in a considerable variation in the magnetic head output depending on the bias state before the playback operation, and therefore the stable playback operation cannot be expected.

According to the present invention, as described above, the advanced application of a decaying alternating current to the magnetic head allows the playback operation to begin in a constant state of magnetization, whereby the stable playback output can be obtained and the Barkausen noise can be suppressed effectively. Particularly, when the invention is applied to a multi-channel magnetic head made up of an array of magnetic head elements, each head element is rid of the aforementioned hysteresis effect, whereby disparity of output characteristics among channels can be eliminated and the stable playback operation is assured.

What is claimed is:

1. A magnetic transducer head utilizing the magnetoresistance effect, comprising:

a magnetoresistance effect element for sensing a magnetic field during each of a plurality of readout operations;

source means for supplying a sense current to said magnetoresistance effect element for sensing resistance change of said magnetoresistance effect element during each readout operation;

a conductor for applying a bias magnetic field to said magnetoresistance effect element by being supplied with a bias current; and an alternating current source for supplying a decaying alternating current superimposed on said bias current to said conductor prior to each readout operation wherein said magnetic field is to be sensed by said magnetoresistance effect element.

2. A magnetic transducer head utilizing the magnetoresistance effect, comprising:

a magnetic circuit formed by a pair of magnetic layers having an effective magnetic gap between said layers confronting a magnetic recording medium which provides a magnetic field representing a recorded signal;

one of said magnetic layers being divided into a front magnetic yoke portion and a rear magnetic yoke portion with a discontinuity region formed therebetween;

a magnetoresistance effect element provided at said discontinuity region and magnetically bridging said front magnetic yoke portion and said rear magnetic yoke portion;

means for supplying an electric sense current to said magnetoresistance effect element for sensing resistance change of said magnetoresistance effect element during each of a plurality of readout operations; and a conductor for applying a bias magnetic field to said magnetoresistance effect element by being supplied with an electric bias current for generating a bias magnetic field, and means for further supplying said conductor with a decaying alternating current superimposed on said electric bias current prior to each said readout operation wherein said magnetic field is to be sensed by said magnetoresistance effect element.

* * * * *